(12) United States Patent
Choi

(10) Patent No.: US 7,748,290 B2
(45) Date of Patent: Jul. 6, 2010

(54) PARKING LEVER SYSTEM FOR VEHICLE

(75) Inventor: Jae Il Choi, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 1036 days.

(21) Appl. No.: 11/204,677

(22) Filed: Aug. 16, 2005

(65) Prior Publication Data
US 2006/0053953 A1 Mar. 16, 2006

(30) Foreign Application Priority Data
Aug. 17, 2004 (KR) .................... 10-2004-0064790

(51) Int. Cl.
*G05G 5/06* (2006.01)
(52) U.S. Cl. ........................................ 74/537
(58) Field of Classification Search ............... 74/473.3, 74/478, 490.12, 490.14, 500.5, 501.6, 512, 74/519, 527, 529, 532, 533, 577 R
See application file for complete search history.

(56) References Cited

U.S. PATENT DOCUMENTS 4,515,036 A * 5/1985 Dotson ........................ 74/535
5,303,609 A * 4/1994 Iwanaga et al. ............... 74/523
2002/0174737 A1* 11/2002 Revelis et al. .............. 74/501.6
2006/0230867 A1* 10/2006 Nitsche ...................... 74/501.6

FOREIGN PATENT DOCUMENTS

| DE | 100 26 006 A 1 | 12/2001 |
| EP | 0 344 369 B1 | 7/1991 |
| JP | 57-186562 A | 11/1982 |

* cited by examiner

*Primary Examiner*—Vicky A Johnson
(74) *Attorney, Agent, or Firm*—Morgan, Lewis & Bockius LLP

(57) ABSTRACT

A parking lever includes a base plate, a parking lever rotatably mounted to the base plate and having a parking brake cable connected thereto, a ratchet disposed on the base plate, a pawl lever rotatably mounted to the parking lever, a button mounted to the parking lever, a rod operably connecting the button to the pawl lever, and a stopper mounted to the parking lever. The lever is moveable from a released state to a parking state in which the pawl lever is engaged with the ratchet. In one embodiment, the parking lever is not released by operation of only the button to prevent accidental release of the parking brake.

9 Claims, 4 Drawing Sheets

PARKING LEVER SYSTEM FOR VEHICLE

CROSS-REFERENCE TO RELATED APPLICATION

This application claims priority to and the benefit of Korean Patent Application 10-2004-0064790 filed in the Korean Intellectual Property Office on Aug. 17, 2004, the entire content of which is incorporated herein by reference.

BACKGROUND OF THE INVENTION (a) Field of the Invention

The present invention relates to a parking lever system for a vehicle. More particularly, the present invention relates to the parking lever system that includes a parking lever that is not released by only an operation of a button at a parked state.

(b) Description of the Related Art

Generally, if a parking lever of a vehicle is pulled upward, the parking lever moves upward and a parked state is realized. In order to maintain the parked state of the vehicle continuously, a driver makes the parking lever locked at a state that the parking lever has been moved upward. In order to release the locked parking lever, the driver releases the locked parking lever by pushing a button mounted to the parking lever and makes the parking lever move downward. However, the button mounted to the parking lever can be pushed in a state in which the driver does not intend to push it. In this case, the parking lever is released accidentally and an accident can occur.

SUMMARY OF THE INVENTION

The present invention has been made in an effort to provide a parking lever system for a vehicle having advantages of enhanced parking safety of a vehicle and accident prevention because the parking brake is not released in a case that the button is pushed accidentally.

An exemplary parking lever system for a vehicle according to an embodiment of the present invention includes a base plate secured to a vehicle body, a parking lever that has a parking cable connected thereto and is rotatably mounted to the base plate, a ratchet plate defining ratchets and being disposed to the base plate, a pawl lever rotatably secured to the parking lever and selectively locked/released to/from the ratchet plate, a button mounted to one end of the parking lever such that the button locks/releases the pawl lever to/from the ratchet plate, a rod connecting the button with the pawl lever, and a stopper secured to the parking lever such that the stopper restricts a movement of the rod. In a further embodiment, the rod comprises a first member connected to the button such that the first member transmits a force from the button, a second member connected to the first member such that the second member transmits the force transmitted from the first member, and a third member connected to the second member such that the third member transmits the force transmitted from the second member to the pawl lever, wherein connecting portions of the first, second, and third members have angles corresponding to angles of the parking lever and the rod is made of a material that has elasticity. The stopper is mounted such that the stopper is vertical to the rod. The stopper is mounted such that the parking lever cannot be released by only an operation of the button in the case that the parking lever is pulled.

DETAILED DESCRIPTION OF THE EMBODIMENTS

An embodiment of the present invention will hereinafter be described in detail with reference to the accompanying drawings.

Figure 1:
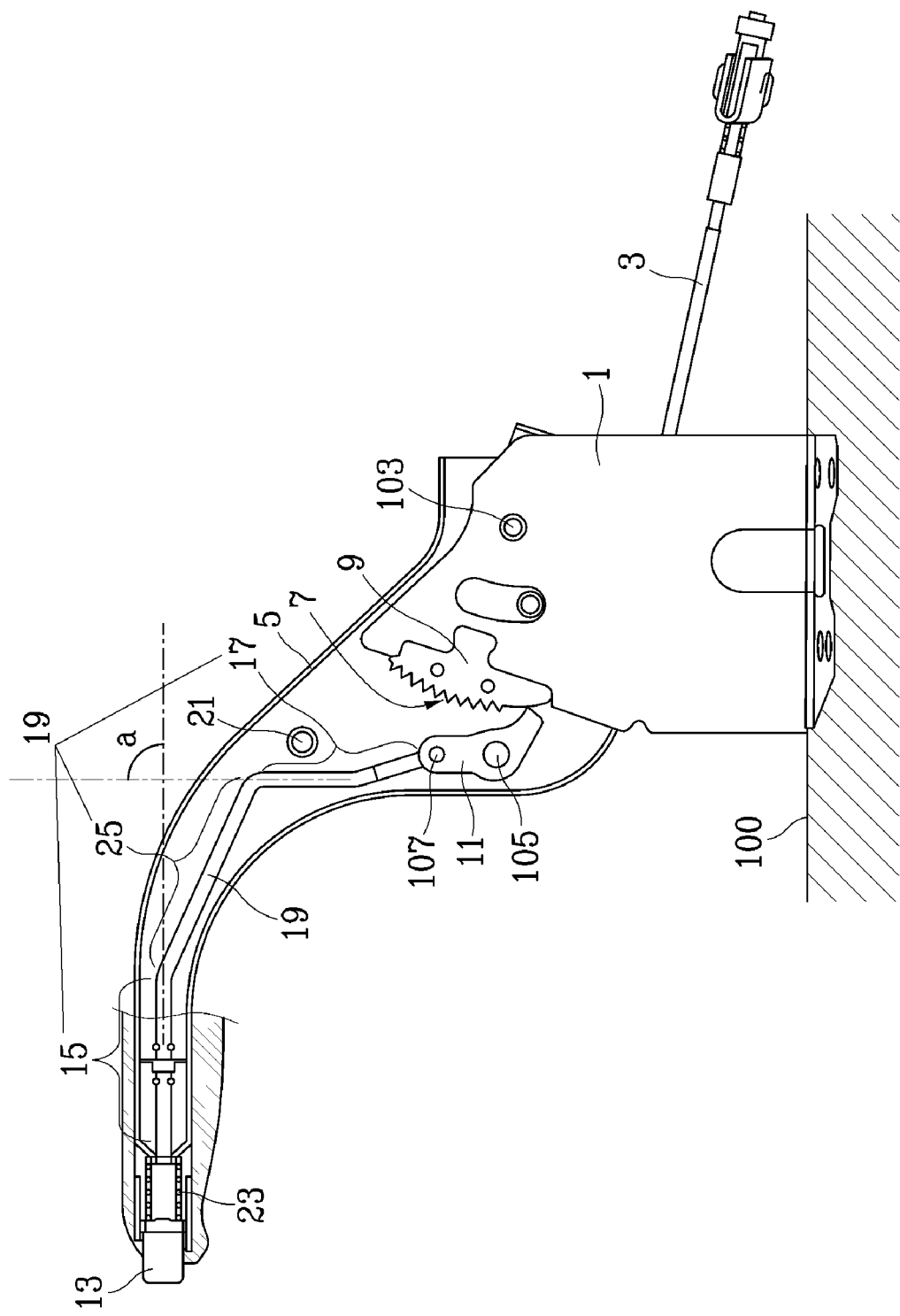
FIG. 1 shows a parking brake released state according to an exemplary embodiment of the present invention.
Figure 2:
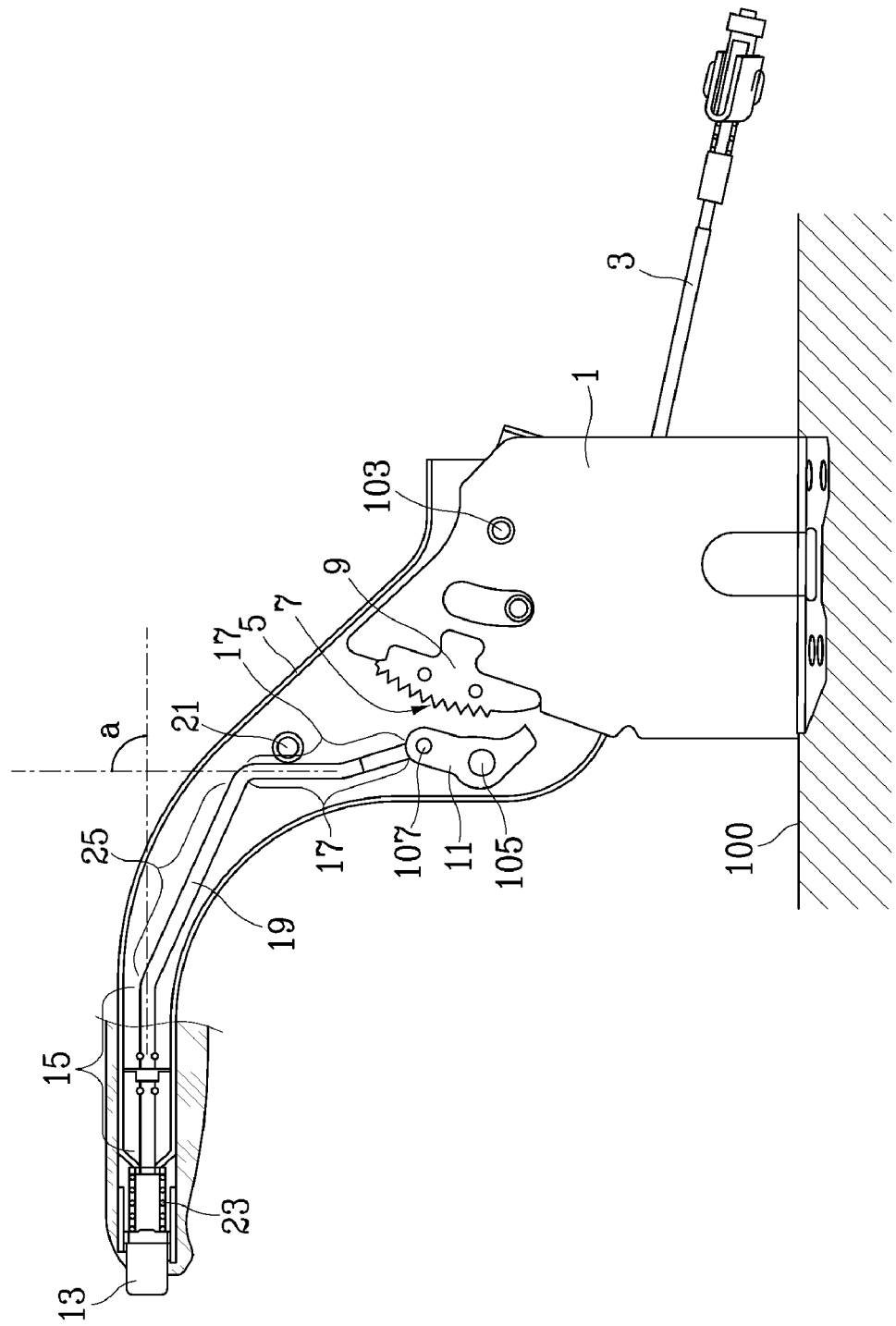
FIG. 2 shows a state that a button is operated when the parking brake released state is realized.

FIG. 1 shows a parking brake released state according to an exemplary embodiment of the present invention and FIG. 2 shows a state that a button is operated when the parking brake released state is realized.

Referring to FIG. 1 and FIG. 2, according to an exemplary embodiment of the present invention, a parking lever system includes a base plate 1, a parking lever 5, a ratchet plate 9, a pawl lever 11, a button 13, a rod 19, and a stopper 21.

The base plate 1 is secured to a vehicle body 100, and the parking lever 5 is rotatably mounted to the base plate 1 and a parking cable 3 is connected thereto.

The ratchet plate 9 is disposed to the base plate 1 and ratchets 7 are formed thereto, and the pawl lever 11 is rotatably secured to the parking lever 5 and selectively locked/released to/from the ratchet plate 9.

The button 13 is mounted to one end of the parking lever 5 such that the button 13 locks/releases the pawl lever 11 to/from the ratchet plate 9, and the rod 19 connects the button 13 with the pawl lever 11.

The stopper 21 is secured to the parking lever 5 such that the stopper 21 restricts a movement of the rod 19.

The pawl lever 11 is not caught on the ratchet 7 of the ratchet plate 9 when the parking brake released state is realized.

The parking lever 5 is rotatably connected to the base plate 1 by a first hinge 103.

In addition, the pawl lever 11 is rotatably connected to the parking lever 5 by a second hinge 105.

Because the rod 19 is rotatably connected to the pawl lever 11 by a third hinge 107, a rectilinear motion of the rod 19 can be transformed to a rotational motion of the pawl lever 11.

Because a return-spring 23 is mounted to a portion at which the button 13 and the rod 19 are connected together, if a force that pushes the button 13 is released, the button 13 and the rod 19 move back to the original position.

The rod 19 includes a first member 15, a second member 25, and a third member 17.

The first member 15 is connected to the button 13 such that the first member 15 can transmit the force transmitted from the button 13, and the second member 25 is connected to the first member 15 such that the second member 25 transmits the force transmitted therefrom.

The third member 17 is connected to the second member 25 such that the third member 17 transmits the force transmitted therefrom to the pawl lever 11.

Connecting portions of the first, second, and third members 15, 25, and 17 are disposed at angles "a" which correspond to an angle of the parking lever 5. In various embodiments, the first and third members are disposed approximately perpendicular to each other (e.g. FIG. 1).

That is, as shown in FIG. 1 and FIG. 2, the first, second, and third members 15, 25, and 17 of the rod 19 are connected at predetermined angles such that the rod 19 can be disposed to an inner portion of the parking lever 5 and the rod 19 is made of a material that has elasticity. The detailed description of the elasticity of the rod 19 is described after.

Referring to FIG. 2, in a case that the button 13 is pushed, the force that pushes the button 13 is transmitted to the rod 19 and rotates the pawl lever 11 clockwise with respect to the second hinge 105.

Therefore, the pawl lever 11 is released from the ratchet 7 of the ratchet plate 9.

Figure 3:
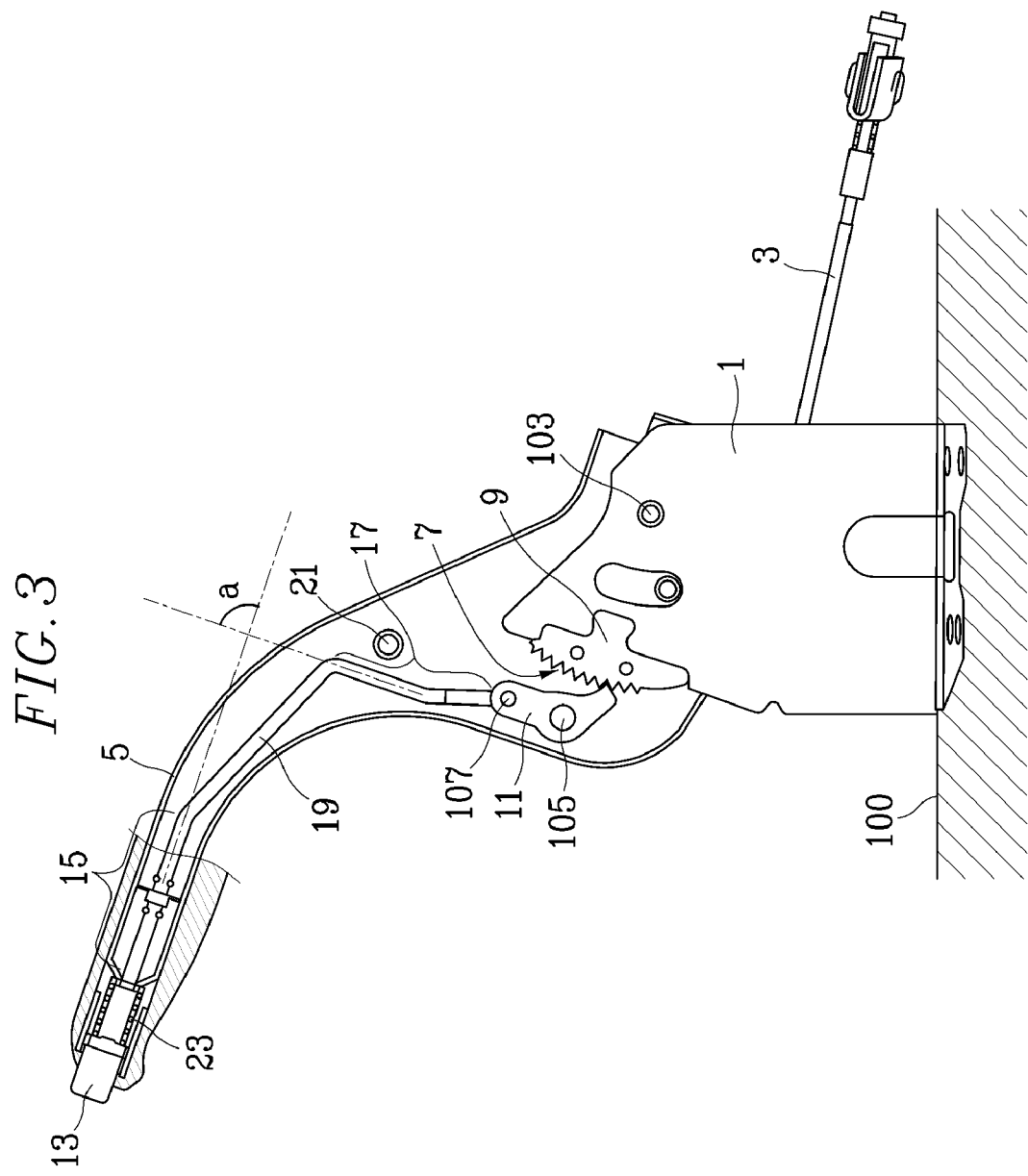
FIG. 3 shows a state that the button is not operated during a parked state.
Figure 4:
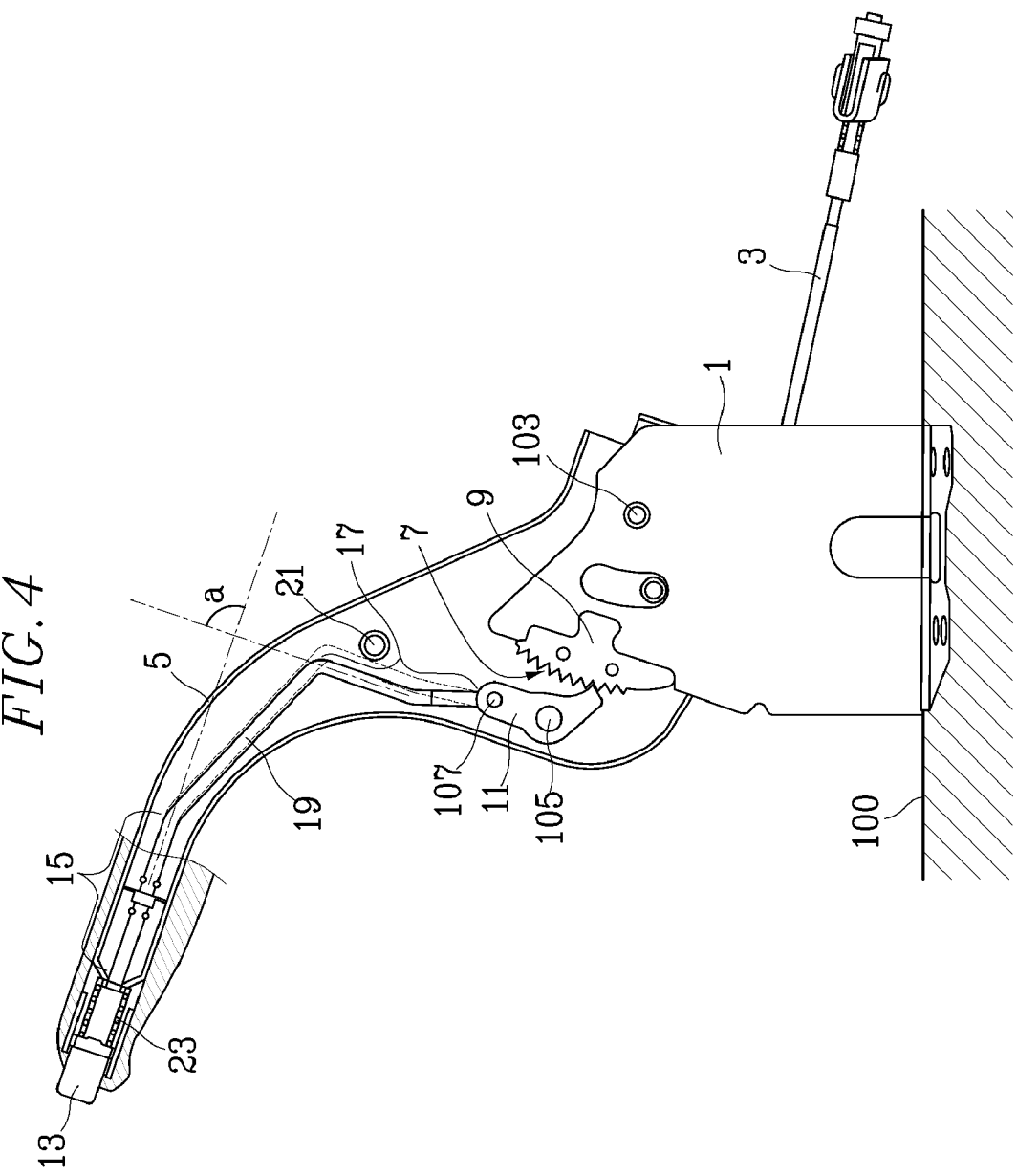
FIG. 4 illustrates an operation of the button during the parked state.

FIG. 3 shows a state in which the button is not operated during a parked state, and FIG. 4 illustrates an operation of the button during the parked state.

In order to operate the parking brake (not shown) if the parking lever is pulled, the parking lever 5 rotates clockwise with respect to the base plate 1.

The parking cable 3 is pulled and the parking brake operates in response to a rotation of the parking lever 5.

Then, if the force that pulls the parking lever 5 is released, as shown in FIG. 3, the parking lever 5 is temporarily secured at a position to which the parking lever is pulled by the pawl lever 11 being stopped at the ratchet 7.

The stopper 21 is vertically disposed to the rod 19. More particularly, the stopper 21 is vertically disposed to the third member 17 of the rod 19.

According to an exemplary embodiment of the present invention, a cross section of the stopper 21 may be formed as a circle, but is not limited thereto.

In a case that the parking lever 5 is pulled, the stopper 21 is mounted such that the parking lever 5 cannot be released by only an operation of the button 13. More particularly, referring to FIG. 3 and 4, in a case that the parking lever 5 is pulled, the pawl lever 11 is temporarily secured to the ratchet plate 9. In this case, the parking state that the pawl lever 11 is locked to the ratchet plate 9 is maintained by a force transmitted from the return-spring 23 to the pawl lever 11 through the rod 19, i.e., a moment urging at a counterclockwise direction, and a force transmitted from the parking cable 3 to the parking lever 5, i.e., a moment urging to the parking lever 5 at a counterclockwise direction.

In this state, as shown in a dotted line in FIG. 4, in a case that only the button 13 is operated, the rod 19 is temporarily deformed by the elasticity thereof and the parking state is not released. That is, because the rod 19 is deformed by the force urged to the button 13, the pawl lever 11 is not released from the ratchet plate 9. That is to say, the elastic force 19 of the rod 19 is predetermined such that the elastic force is smaller than the force transmitted from the parking cable 3 to the ratchet plate 9. However, if a movement of the rod 19 is increased by which the force urged to the button 13 is increased, the pawl lever 11 may be released from the ratchet plate 9 by which the pawl lever 11 rotates at a clockwise direction, but the movement of the rod 19 is restricted by the stopper 21. Therefore, in a case that only the button 13 operates at the parking state, the parking state is not released regardless of a magnitude of the force urged to the button 13.

In order to release the parking state, at a state in FIG. 4, the parking lever 5 has to be pulled upward. That is, in concurrence with the button 13 being pushed, if the parking lever 5 is pulled, the pawl lever 11 is released from the ratchet plate 9 by which the elastic force is urged by the deformation of the rod 19 and the parking state is released.

As described above, according to an exemplary embodiment of the present invention, the parking lever is released only in a case that the parking lever is lifted when the button is pushed by a driver.

Therefore, parking safety of a vehicle can be enhanced and an accident can be prevented because the parking brake is not released in a case that the button is pushed accidentally.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A parking brake operator for a vehicle comprising:
a base plate defining a ratchet;
a parking brake lever rotatably connected to the base plate, the lever movable upwards from a first position to a second position;
a brake cable connected to the lever for operating a parking brake;
a button mounted to the lever and axially movable;
a rod having one end connected to the button and a second end connected to a pawl, the pawl movable into and out of engagement with the ratchet; and
a stopper mounted to the lever and spaced laterally apart from at least one portion of the rod;
wherein when the lever is in the second position, the pawl is engaged with the ratchet and pressing the button does not disengage the pawl from the ratchet,
wherein the rod further comprises a first member, second member, and third member, and the first, second, and third members are disposed at an angle to each other,
wherein the first and third members are disposed approximately perpendicular to each other,
wherein the second end of the rod is offset from a longitudinal axis of the first member thereof with a predetermined distance and the stopper is disposed therebetween to selectively engage with the rod,
wherein the rod contacts the stopper when pressing the button in the second lever position, and
wherein the second position is at an angle between about horizontal and about vertical.

2. The brake operator of claim 1, wherein while further moving the lever upward from second position disengages the pawl from the ratchet.

3. The brake operator of claim 2, wherein the lever is movable downwards to the first position.

4. The brake operator of claim 1, wherein the rod elastically deforms.

5. The brake operator of claim 1, wherein the first position represents a parking brake released position and the second position represents a parking brake activated position.

6. The brake operator of claim 1, wherein the first position is essentially horizontal.

7. The brake operator of claim 1, wherein the button disposed in an end of the lever and movable from a fully extended position protruding from the lever to a partially extended position protruding from the lever less than the fully extended position.

8. The brake operator of claim 7, further comprising a spring biasing the button into the fully extend position.

9. The brake operator of claim 1, wherein the stopper is transversely mounted to the lever.

* * * * *